United States Patent Office 3,227,382
Patented Jan. 4, 1966

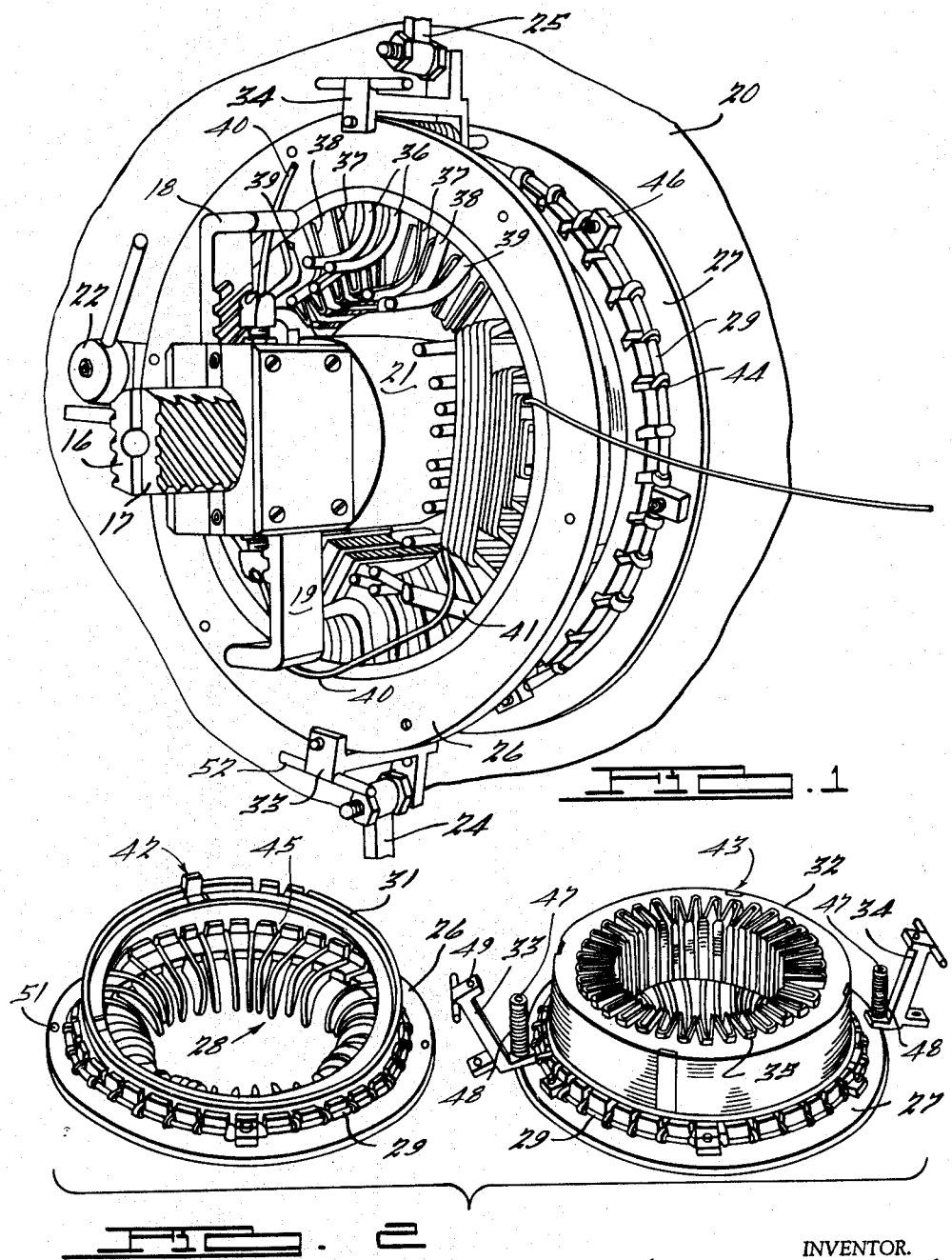

3,227,382
COIL WINDING MACHINE
Robert E. Frederick, Detroit, Mich., assignor to Link Engineering Company, Detroit, Mich., a corporation of Michigan
Original application Jan. 15, 1958, Ser. No. 709,150, now Patent No. 3,082,966, dated Mar. 26, 1963. Divided and this application Dec. 19, 1962, Ser. No. 245,918
9 Claims. (Cl. 242—1.1)

This invention relates to fixtures for stator cores to be wound, and particularly to a pair of fixtures having a plurality of pivoted fingers thereon for guiding the wire when the coils of the poles are wound, and is a division of Serial No. 709,150 filed January 15, 1958, now Patent No. 3,082,966.

Difficulty has always been experienced when winding coils on the poles of stator cores due to the fact that guide fingers must be employed about which the coils of different diameters are wound. Heretofore, the fingers were separate removable elements which were manually placed in position after the core was placed in the fixture and were manually removed before the wound stator could be removed therefrom.

In the present arrangement, a pair of fixtures are employed, each having a plurality of fingers which are mounted on pivots with a removable ring so utilized as to have the fingers rigidly positioned after the stator core has been mounted between the fixture. The fingers are free to pivot from beneath the wound coils when the ring is released as the fixtures are removed from the core. The ring of the fixture has a guide projection for locating the fixtures relative to the stator core and each other. Clamping arms are carried by one of the fixtures which lock the stator core between the fixtures when clamped to the other fixture. The assembly is mounted on the winding machine and, after the coils are wound and the assembly removed, it is only necessary to release the clamping arms to permit the fingers of the fixtures to move from the coils as the fixtures are removed from the wound stator core. With this arrangement, considerable time is saved in assembling a stator core between the fixtures, the error resulting from the improper location of the fingers is avoided and the loss of the loose fingers is prevented.

Accordingly, the main objects of the invention are: to provide a pair of fixtures for supporting a stator on a winding machine, each having pivoted fingers mounted thereon; to provide a pair of fixtures with pivoted fingers which are rigidly retained in position by a ring when the fixtures are secured to opposite faces of a stator core; to secure a pair of fixtures having a plurality of pivoted fingers thereon on opposite sides of a stator core by pivoted clamps carried by one of the fixtures which maintain the fingers in rigid position; to provide a fixture with a wire ring having spaced fingers pivoted thereon for forming supports on which wire is wound when a stator core is clamped between a pair of fingers, and, in general, to provide pivoted fingers on a wire winding fixture which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a perspective view showing the stator core and the attached fixture in its mounted position relative to the winding head of the machine with coils of a pole wound over fingers of the fixture at a point where the slotted core and insulating materials has been removed for clarity, and FIG. 2 is a perspective view showing separated parts of the loading fixture and wire guide fingers for the stator core.

As illustrated in FIG. 1, a pair of rack elements 16 and 17 operate a pair of arms 18 and 19 outwardly when the rack elements are advanced forwardly of a shaft 21. The shaft is then rotated to have the wires 40 carried by the arms 18 and 19 moved across the fingers 28 of a fixture 26 at one end of a stator core 32 after which the arms 18 and 19 are retracted through the rearward movement of the racks 16 and 17. The shaft 21 is moved rearwardly through the stator core 32 to lay the wires in slots therein after which the operation is repeated at the opposite end of the stator core in relation to the fingers on the other fixture 27. Upon the front face of a plate 20 which is supported on the front of the coil winding machine are a pair of wire clamps 22 and a pair of quick release fixture clamps 24 and 25. The pair of fixtures and the stator core 32 are shown partially disassembled in FIG. 2.

After all of the coils have been wound upon the series of fingers 28, the clamps 24 and 25 are released, permitting the fixtures 26 and 27 and the wound stator core to be removed from the adapter plate 20 at the front of the machine. As illustrated in FIG. 2, the fixtures 26 and 27 are clamped to the stator core by the elements 33 and 34 along with the locking rings 31 which lock the fingers 28 against movement. The fixtures 26 and 27, along with the rings 31, are released from the stator core 32, permitting the fingers 28 to pivot from the wound coils.

It will be noted in FIG. 2 that each of the rings 31 carries a projecting finger 42 which mates with a slot 43 in the stator core 32 so as to accurately locate the rings 31 and therefore the fingers relative to the slots in the stator core. Four slots are provided in the stator core, one for each of the four poles to be wound so that the ring and fixtures when clamped in any of the slots will have each of the four sets of fingers 28 accurately located relative to the slots in the four poles. The fingers 28 are curved to extend outwardly from within the stator core, with the opposite ends containing an aperture 44 through which the annular wire or sections 29 thereof extend to form pivots. The fingers are accurately located in slots 45 provided in the fixtures 26 and 27, and the pivots 29 are secured thereto by clamping blocks 46.

The fixtures 26 and 27 with the rings 31 thereon which maintain the fingers 28 in rigid position are applied to opposite ends of the stator core 32, making the core itself a part of the fixture when the clamps 33 and 34 secure the fixtures 26 and 27 on the opposite ends of the stator core. After the coils have been wound on the poles of the stator core and the assembly is removed from the plate 20, the release of the clamps 33 and 34 releases the rings 31 which permits the fingers 28 to pivot from within the wound coils and the fixtures to be removed from the end of the wound stator. It will be noted that the fixtures 26 and 27 are of like construction with the exception that the clamps 33 and 34 are secured to the fixture 27 on screws 47 having springs 48 disposed thereon. The spring and screw support permits the hinging of the clamps 33 and 34 from an open position as illustrated in FIG. 2, to an inward position in which pins 49 on the clamps enter apertures 51 in the fixture 26. After the assembly is removed from the plate 21, it is only necessary to raise the handle portions 52 of the clamps 33 and 34 to move the pins 49 from the apertures 51 and to swing the clamps outwardly to release the fixture 26 from the fixture 27 and the wound stator core. When a stator core is to be wound, it is only necessary to apply the fixtures 26 and 27 with the rings 31 thereon to the opposite faces of the core aligned thereon through the engagement of the finger 42 with a slot 43 in the core and to retain the assembly in unit relation by the locking of the clamps 33 and 34 across the fixtures. The assembly is secured to the plate 20 by the clamps 24 and 25, engaging the clamps 33 and 34 which thereby align the pole slots of the stator core relative to the winding head of the machine.

What is claimed is:

1. In a mounting fixture for a stator core having slots within which wire coils are to be wound, a pair of washerlike plates having slots on the inner edge, a plurality of curved fingers extending into said slots and projecting outwardly thereof, means pivotally supporting the one end of said fingers in said slots, releasable means secured to said plate for preventing said fingers from pivoting before being secured to a stator core, and means for securing a pair of said washerlike plates at opposite ends of a stator core with the fingers extending adjacent to the core slots.

2. In a mounting fixture for a stator core, a washerlike plate having the inner edge containing a plurality of slots, fingers in said slots, a wire ring for supporting said fingers for pivotal movement, means for securing said ring on said washerlike plate, and means for locking said fingers against pivotal movement before being applied to a stator core.

3. In a mounting fixture for a stator core, an annular plate containing a plurality of slots extending inwardly from the inner peripheral edge thereof, fingers in said slots, arcuately shaped means struck from the same center as said annular plate for supporting said fingers for pivotal movement in said slots, means for securing said arcuately shaped means on said annular plate, releasable means for locking said fingers against said pivotal movement before being secured to a stator core, a pair of said plates forming a fixture when disposed on opposite faces of the stator core, and means for clamping said plates in fixed relation to each other and said core.

4. In a mounting fixture for a stator core, an annular plate containing a plurality of slots extending inwardly from the inner peripheral edge thereof, fingers in said slots, ring means supporting said fingers for pivotal movement in said slots, means for securing said ring means on said annular plate, releasable means for locking said fingers against pivotal movement before being secured to a stator core, a pair of said plates forming a fixture when disposed on opposite faces of the stator core, means for clamping said plates in fixed relation to each other and said core, and a finger on said releasable means engageable with a notch in a stator core for accurately locating the plates relative to the core and to each other.

5. In a mounting fixture for a stator core, a washerlike plate having a plurality of slots on the inner edge, fingers in said slots, wire means supporting said fingers for pivotal movement, means for securing said wire means on said washerlike plate, a ring releasably mounted on said plate for locking said fingers in fixed position, a pair of said plates forming a fixture when disposed on opposite faces of the stator core, means for clamping said plates in fixed relation to each other and said core, and a finger on said ring engageable with a notch in a stator core for accurately locating the plates relative to the core and to each other, the release of said plates after the coils are wound on the stator core releases the locking rings and permits the fingers to rotate from beneath the wound coils and to be separated therefrom.

6. In a mounting fixture for a stator core, a washerlike plate having slots extending inwardly from the inner edge, fingers in said slots, means supporting said fingers for pivotal movement, means for securing said supporting means on said washerlike plate, and means supported by said plate for releasably retaining said fingers from pivoting before being applied to the stator.

7. In a mounting fixture for a stator core, a washerlike plate having slots extending inwardly from the inner edge, fingers in said slots, means supporting said fingers for pivotal movement, means for securing said supporting means on said washerlike plate, means supported by said plate for releasably retaining said fingers from pivoting before being applied to a stator, and means for releasably clamping a core between a pair of plates in axial relation to each other.

8. In a mounting fixture for a stator core, a washerlike plate having slots extending inwardly from the inner edge, fingers in said slots, means supporting said fingers for pivotal movement, means for securing said supporting means on said washerlike plate, means supported by said plate for releasably retaining said fingers from pivoting before being applied to a stator, means for releasably clamping a core between a pair of plates and to a base, and means for releasing said means supported by said plate to permit the fingers to pivot during the axial separation of the plate from the core.

9. In a mounting fixture for a stator core, a washerlike plate having slots extending inwardly from the inner edge, fingers in said slots, ring means supporting said fingers for pivotal movement, means for securing said ring means on said washerlike plate, means supported by said plate for releasably retaining said fingers from pivoting before being applied to a stator core, means for clamping a core between a pair of said plates in axial relation to each other, and means for locating the plates relative to each other and the core.

References Cited by the Examiner

UNITED STATES PATENTS 2,967,672   1/1961   Zwayer _____ 242—1.1

MERVIN STEIN, *Primary Examiner.*